2,901,460
HALOSILANE HYDROLYSIS WITH TETRA-HYDROFURAN AND WATER

Edith M. Boldebuck, Schenectady, N.Y., assignor to General Electric Company, a corporation of New York No Drawing. Application February 7, 1956
Serial No. 563,840

5 Claims. (Cl. 260—46.5)

This invention relates to a method of hydrolyzing halogenosilanes. More particularly, it is concerned with an improved process for hydrolyzing individual chlorosilanes or organochlorosilanes or mixtures thereof in the presence of tetrahydrofuran.

It is well known that halogenosilanes or organohalogenosilanes or mixtures thereof readily hydrolyze when mixed with water to form silanols which condense or can be caused to condense to form polysiloxanes. The ease with which the silanols condense is dependent on the nature of any organic radicals present and also on the number of silanol groups per silicon atom. When there are more than three halogens attached to silicon or when all of the organic groups attached to silicon are methyl groups, the rate of dehydration or condensation is so rapid that for all practical purposes the condensation of the silanols occurs simultaneously with the hydrolysis of the chlorosilanes. Because both reactions occur almost instantaneously, the hydrolysis of chlorosilanes of this type results in the formation of insoluble gels which cannot be used in the manufacture of useful resinous compositions or in the formation of products of low average molecular weight rather than the high average molecular weight products sought in the preparation of resinous products in general.

Various methods have been devised for controlling the hydrolysis reaction and, to some extent, the condensation reaction with the general object of preventing gel formation and improving the hardness, cure time and other properties of the products. For example, the chlorosilanes have been dissolved in ether and the resultant solution added to ice or a mixture of ice and water. Another process comprises the solution of the chlorosilanes in a solvent such as toluene and the addition of this solution to a mixture comprising water and a higher alcohol such as butanol. Still other processes involve the solution of the chlorosilanes in media such as nitriles or nitro compounds. Although these methods result in the formation of liquid, heat hardenable products, they also involve certain disadvantages. The first disadvantage found is that large volumes of solvents are usually necessary for the hydrolysis and in many cases the resinous products possess poor craze resistance. Furthermore, one of the products of the hydrolysis reaction is hydrogen chloride which must be removed from the hydrolyzate prior to resin formation. In some of these prior processes, removal of hydrogen chloride is extremely difficult. A further disadvantage found in some of these prior art processes is that the hydrolyzate tends to gel very rapidly and, of course, when gelling occurs, the hydrolysis products are useless in the preparation of resinous materials.

An object of this invention is to provide a method for the hydrolysis of chlorosilanes in which the hydrogen chloride resulting from the hydrolysis is easily removed from the hydrolyzate.

A still further object of the present invention is to provide a method for the hydrolysis of chlorosilanes which alleviates some of the gelling problems associated with prior art methods.

I have discovered that the above and other objects which will become apparent from the following detailed description of the invention, can be obtained by employing a hydrolysis medium comprises a mixture of water and tetrahydrofuran.

The chlorosilanes employed in the practice of my invention includes specific chlorosilanes and mixtures of chlorosilanes containing an average from 2.5 to 4 silicon-bonded halogen atoms with the remaining valences of silicon being satisfied by members selected from the class consisting of hydrogen and monovalent organic radicals bonded to silicon through silicon-carbon linkages. Among the chlorosilanes and mixtures of chlorosilanes which may be hydrolyzed by the method of the present invention are included those within the scope of the following formula (1) 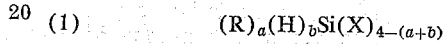$(R)_a(H)_bSi(X)_{4-(a+b)}$ where R represents members selected from the class consisting of alkyl radicals, e.g., methyl, ethyl, propyl, isopropyl, butyl, octyl, etc. radicals; alkenyl radicals, e.g., vinyl, allyl, etc. radicals; cycloalkyl radicals, e.g., cyclohexyl, cycloheptyl, etc. radicals, aryl radicals, e.g., phenyl, diphenyl, xylyl, etc. radicals; aralkyl radicals, e.g., phenylethyl, benzyl, styryl, etc. radicals; haloaryl radicals, e.g., chlorophenyl, dibromophenyl, tetrachlorophenyl, etc. radicals; and substituted alkyl radicals, e.g., chloromethyl, pentafluoroethyl, cyanomethyl, β-cyanoethyl, etc. radicals; X represents halogen, e.g., fluorine, chlorine, bromine, etc.; $a$ has a value from 0 to 1.5, inclusive, $b$ has a value from 0 to 1.5, inclusive, and the sum of $a+b$ is equal to from 0 to 1.5, inclusive. Specific chlorosilanes within the scope of the present invention include, for example, silicon tetrachloride, trichlorosilane, methyltrichlorosilane, phenyltrichlorosilane, β-cyanoethyltrichlorosilane, chlorophenyltrichlorosilane, benzyltrichlorosilane, etc.

The halogenosilanes which are employed in the practice of this invention are well known in the art and for details of the properties and methods of preparation of these materials attention is directed to "Chemistry of the Silicones," E. G. Rochow, second edition, John Wiley & Sons, Inc., New York (1951). The halogenosilanes containing silicon-bonded β-cyanoethyl radicals are described in the application of Maurice Prober, Serial No. 401,702, filed December 31, 1953.

The hydrolysis of the present invention may be carried out with specific chlorosilanes or with mixtures of chlorosilanes. Thus, any of the specific halosilanes mentioned above or others within the scope of Formula 1 may be hydrolyzed by merely contacting the halogenosilane with a mixture of water and tetrahydrofuran. Where individual halogenosilanes are hydrolyzed, the hydrolyzate comprises silanols in which the halogen group of the halogenosilane is replaced by a hydroxyl group. In addition, the hydrolyzate includes the water and tetrahydrofuran which was used in the hydrolysis plus dissolved hydrogen chloride which is formed during the hydrolysis. After the hydrolysis reaction of the present invention, it is found that the hydrolyzate is much more resistant to gelling than hydrolyzates formed by most of the prior art methods. In addition, it is found that the hydrolyzed organo halogenosilanes tend to separate from the hydrolysis medium upon standing to yield products which vary from low viscosity fluids to high viscosity fluids. Any residual hydrogen chloride in the separated hydrolyzate may then be removed by washing the hydrolyzate with water.

A particular advantage of my process is that hydrolyzates of individual halogenosilanes may be formed and the individual hydrolyzates of different materials may be combined to form mixtures of hydrolyzates of any desired organic radical to silicon atom ratio and any desired hydroxyl group to silicon atom ratio. Thus, for example, the hydrolyzates of silicon tetrachloride, methyltrichlorosilane, dimethyldichlorosilane, and trimethylchlorosilane, may be combined to form compositions in which the methyl to silicon ratio may vary from a little more than 0 up to a little less than 3. It is obvious that these mixed hydrolyzates may then be further condensed, for example, by heating, to form polymeric silicones having any desired methyl to silicon ratio. Similarly, instead of employing the hydrolyzates of methyl chlorosilanes, the hydrolyzates of other types of organochlorosilanes, such as, for example, phenylhalogenosilanes, $\beta$-cyanoethylhalogenosilanes, and the like may be mixed with any other materials to form mixtures containing silicon-bonded methyl, silicon-bonded phenyl, silicon-bonded $\beta$-cyanoethyl, and the like radicals and the appropriate amount of silicon-bonded hydroxy groups. This mixed hydrolyzate may then be further condensed to form resins having the desired organo to silicon ratio with the organo groups being made up of the desired relative proportions of methyl, phenyl, and $\beta$-cyanoethyl radicals.

The process of the present invention may also be carried out by preparing first a mixture of a plurality of different mixed halogenosilanes and contacting this mixture with water and tetrahydrofuran to form the hydrolyzate. Thus, for example, where it is desired to prepare a methylpolysiloxane resin having a ratio of 1.5 methyl groups per silicon atom, an equimolar mixture of methyltrichlorosilane and dimethyldichlorosilane is added to a mixture of water and tetrahydrofuran. After the two chlorosilanes are hydrolyzed, the hydrolyzate separates from the water and tetrahydrofuran mixture. This hydrolyzate may then be washed several times with water to remove any trapped hydrogen chloride and the resulting washed material is ready for further condensation into a methyl silicone resin. This further condensation is accomplished by merely heating the washed hydrolyzate at a temperature of from 150 to 200° C. or in the alternative the hydrolyzate may be heated in the presence of a suitable catalyst which accelerates the condensation.

In carrying out the process of the present invention, the proportions of the halogenosilane, the water, and the tetrahydrofuran may vary within wide limits. Satisfactory results have been obtained in hydrolyzing halogenosilanes, however, when the ratio of water to halogenosilane has varied from about 1 to 25 or more moles of water per mole of hydrolyzable halogen. The ratio of the number of moles of tetrahydrofuran per mole of hydrolyzable halogen may vary from about 1.0 to 20 or more moles of tetrahydrofuran per mole of hydrolyzable halogen. In the preferred embodiment of my invention, I employ about 15 moles of water per mole of hydrolyzable halogen and about 2.0 moles of tetrahydrofuran per mole of hydrolyzable halogen. The reaction of the present invention may be carried out at temperatures of from below room temperature up to the boiling point of tetrahydrofuran which is about 65° C. In carrying out the hydrolysis, starting at room temperature, it is often found that the heat of the reaction causes the reaction mixture to go from room temperature (about 25° C.) up to a temperature of about 35–55° C. I have found that satisfactory results are obtained when the reaction is carried out within these temperature limits. After the hydrolysis reaction is accomplished, the hydrolyzate is allowed to stand until it separates from the hydrolysis medium and the tetrahydrofuran. After this is accomplished, the hydrolyzate is ready for mixture with other hydrolyzates or is ready to be further condensed to form silicone resins.

The following examples are illustrative of the practice of my invention and are not intended for purposes of limitation.

Example 1

A mixture of 26.2 grams of methyltrichlorosilane, 33.0 grams of $\beta$-cyanoethyltrichlorosilane, 27.1 grams of dimethyldichlorosilane and 36.0 grams of diphenyldichlorosilane, and 111.3 grams of tetrahydrofuran is formed. Over a 12 minute period this mixture is then added to a mixture of 464 grams of water and 141.4 grams of tetrahydrofuran with stirring, during which time the temperature rises from room temperature to a final temperature of about 54° C. This hydrolyzate is then allowed to stand until an oily layer settles to the bottom. The oily layer, which is the hydrolyzate, is separated from the upper water-tetrahydrofuran layer and washed with water several times to remove any entrained hydrogen chloride. When this washed hydrolyzate is heated at a temperature of 250° C. for 2 hours, a hard resinous organopolysiloxane is formed which contains methyl, $\beta$-cyanoethyl, and phenyl radicals bonded to silicon through silicon-carbon linkages.

Example 2

The procedure of Example 1 is followed except that 37 grams of phenyltrichlorosilane is substituted for the 33.0 grams of $\beta$-cyanoethyltrichlorosilane of Example 1. After hydrolysis of this mixture and the separation of the hydrolyzate from the reaction mixture and the washing of the hydrolyzate, a resin is formed by heating which contains methyl and phenyl radicals attached to silicon through silicon-carbon linkages.

Example 3

This example illustrates the superiority of the hydrolysis solvent of the present invention (tetrahydrofuran) over the previously used hydrolysis solvents. Silicon tetrachloride was hydrolyzed in tetrahydrofuran, dioxane and acetone. In each hydrolysis, the ratio of water to hydrolyzable chlorine in the silicon tetrachloride was 1.0. The mole ratio of solvent to hydrolyzable chlorine was approximately 6.5. These hydrolyses were carried out by mixing silicon tetrachloride in a portion of the solvent and adding this mixture rapidly with stirring to a mixture one part by weight of water in four parts by weight of solvent. It was found that the hydrolyzate formed in tetrahydrofuran had not gelled at the end of eleven days, while that formed in dioxane gelled within two and one-half to three days and that formed in acetone gelled in less than two days.

Example 4

As a further illustration of the gel resistance of solutions hydrolyzed in tetrahydrofuran, an equimolar mixture of silicon tetrachloride and methyltrichlorosilane was mixed with tetrahydrofuran or acetone and this mixture was added to a mixture of the solvent and water. In all cases, the amount of water present was sufficient to supply one mole of water per mole of hydrolyzable chlorine and the amount of tetrahydrofuran present was sufficient to provide about 3.9 moles of solvent per mole of hydrolyzable chlorine. The water-solvent mixture contained 4 parts by weight of solvent per part of water. After adding the chlorosilane-solvent mixture to the water-solvent mixture and thoroughly stirring until a homogeneous solution was obtained, the homogeneous solution was placed in a stoppered bottle and the time required for gelling was observed. Where tetrahydrofuran was used as a solvent, about ten days were required before the solution gelled. With acetone as the solvent the mixture had gelled in about one-half day.

Example 5

In this example, the time required for a hydrolyzate of methyltrichlorosilane and trichlorosilane to gel was observed in each of the solvents tetrahydrofuran, dioxane and acetone. In this example an equimolar mixture of methyltrichlorosilane and trichlorosilane in the solvent was added to a mixture of water in the same solvent. The amount of water employed was sufficient to provide one mole of water per mole of hydrolyzable chlorine. The amount of solvent supplied was sufficient to provide 3.5 moles of solvent per mole of hydrolyzable chlorine and the weight ratio of solvent to water in the solvent-water mixture was 4 to 1. The time required for the hydrolyzate in tetrahydrofuran to gel was about three hours, while the hydrolyzate in dioxane gelled in only one and one-quarter hours and the hydrolyzate in acetone gelled within five minutes.

While the process of the present invention has been described only in terms of the limited number of halogenosilanes, it should be understood that any halogenosilane may be hydrolyzed with tetrahydrofuran and water by the process of the present invention. In addition, any mixture of halogenosilanes may be cohydrolyzed by this process. And although the ratio of the various ingredients in the hydrolysis mixture have been described in terms of only a limited number of ratios, it should be understood that this ratio may vary within extremely wide limits. In general, I prefer the amount of water present in the hydrolysis medium to be at least the molar equivalent of the moles of hydrolyzable chlorine in the hydrolysis mixture. However, it is also possible by the process of the present invention to form a partial hydrolyzate of halogenosilane or mixture of halogenosilanes by employing less than the amount of water theoretically required for total hydrolysis.

Thus, it is seen that the process of the present invention provides a useful method for forming conventional organopolysiloxane resins, elastomers, and fluids. In preparing all of these products, the hydrolyzate is allowed to separate from the solvent medium and is washed to remove any entrained hydrogen halide. The hydrolyzate may then be stripped of any remaining solvent by fractional distillation. The stripped hydrolyzate is then condensed by conventional methods to form the desired product.

What I claim as new and desire to secure by Letters Patent of the United States is:

1. The method of hydrolyzing a chlorosilane composition having a chlorine-to-silicon ratio of at least 2.5, there being present in said chlorosilane composition a trichlorosilane, the remaining 0 to 1.5 silicon-bonded members, other than the chlorine, of the chlorosilane being selected from the class consisting of hydrogen, alkyl, cyanoalkyl, alkenyl, cycloalkyl, aryl, aralkyl, and haloaryl radicals, which method comprises adding said chlorosilane composition to a hydrolysis medium in which the amount of water used is sufficient to hydrolyze all the silicon-bonded chlorine atoms, the said hydrolysis medium being maintained at a temperature of from 25° to 65° C. and comprising a mixture of water and tetrahydrofuran, there being employed from 1 to 25 mols water and from 1 to 20 mols tetrahydrofuran per mol of hydrolyzable chlorine.

2. The method of hydrolyzing a chlorosilane mixture of silicon tetrachloride and methyltrichlorosilane in which the mixture has a chlorine-to-silicon ratio of at least 2.5, which method comprises adding said chlorosilane mixture to a hydrolysis medium in which the amount of water is sufficient to hydrolyze all the silicon-bonded chlorine atoms, said hydrolysis medium being maintained at a temperature of from 25° to 65° C. and comprising a mixture of water and tetrahydrofuran, there being employed from 1 to 25 mols water and from 1 to 20 mols tetrahydrofuran per mol of hydrolyzable chlorine.

3. The method of hydrolyzing a chlorosilane mixture of trichlorosilane and methyltrichlorosilane in which the mixture has a chlorine-to-silicon ratio of at least 2.5, which method comprises adding said chlorosilane mixture to a hydrolysis medium in which the amount of water is sufficient to hydrolyze all the silicon-bonded chlorine atoms, said hydrolysis medium being maintained at a temperature of from 25° to 65° C. and comprising a mixture of water and tetrahydrofuran, there being employed from 1 to 25 mols water and from 1 to 20 mols tetrahydrofuran per mol of hydrolyzable chlorine.

4. The method of hydrolyzing silicon tetrachloride which comprises adding the silicon tetrachloride to a hydrolysis medium in which the amount of water is sufficient to hydrolyze all the silicon-bonded chlorine atoms, said hydrolysis medium being maintained at a temperature of from 25° to 65° C. and comprising a mixture of water and tetrahydrofuran, there being employed from 1 to 25 mols water and from 1 to 20 mols tetrahydrofuran per mol of hydrolyzable chlorine.

5. The method of hydrolyzing phenyltrichlorosilane which comprises adding the latter to a hydrolysis medium in which the amount of water is sufficient to hydrolyze all the silicon-bonded chlorine atoms, said hydrolysis medium being maintained at a temperature of from 25° to 65° C. and comprising a mixture of water and tetrahydrofuran, there being employed from 1 to 25 mols water and from 1 to 20 mols tetrahydrofuran per mol of hydrolyzable chlorine.

References Cited in the file of this patent

UNITED STATES PATENTS

| 2,486,162 | Hyde | Oct. 25, 1949 |
| 2,534,149 | Sauer | Dec. 12, 1950 |
| 2,698,334 | Rust et al. | Dec. 28, 1954 |
| 2,717,900 | Plueddemann et al. | Sept. 13, 1955 |

FOREIGN PATENTS

| 888,851 | Germany | Sept. 7, 1953 |